Feb. 25, 1964   W. H. COULTER ETAL   3,122,431
METHOD OF MAKING A SCANNER ELEMENT FOR PARTICLE ANALYZERS
Original Filed Dec. 29, 1958
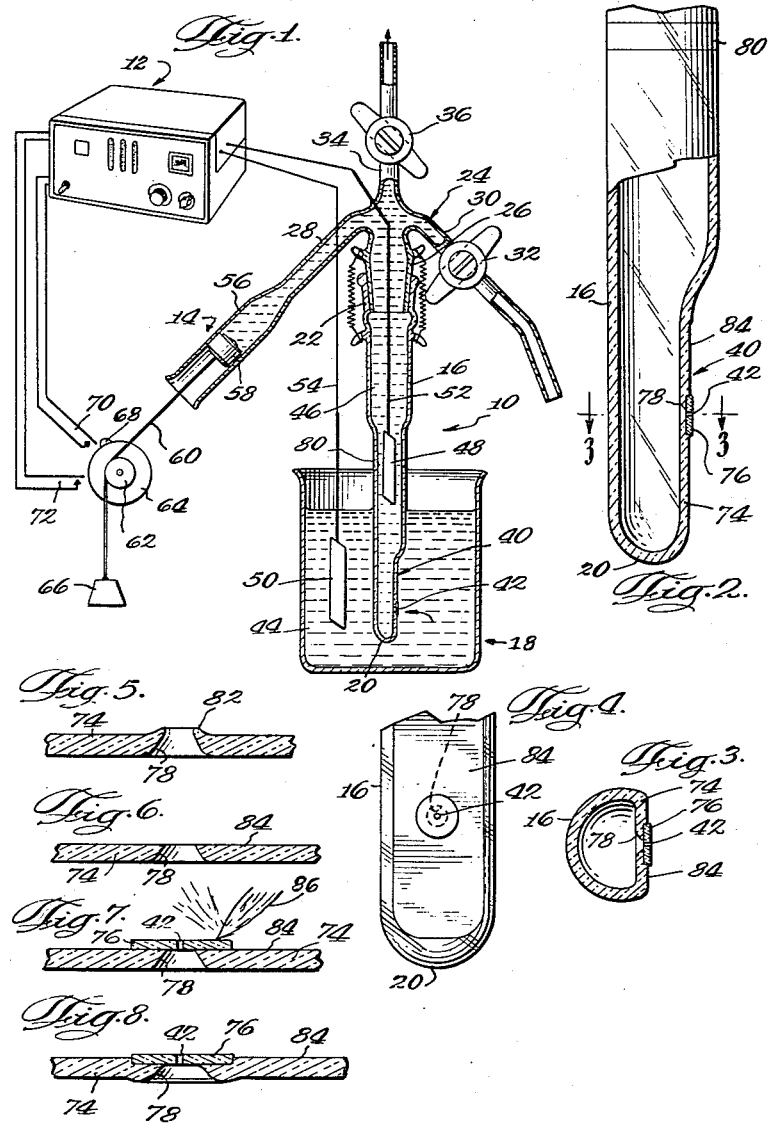
WALLACE H. COULTER
ROBERT H. BERG
FRED L. HEUSCHKEL
INVENTORS 3,122,431
METHOD OF MAKING A SCANNER ELEMENT FOR PARTICLE ANALYZERS
Wallace H. Coulter, Chicago, Fred L. Heuschkel, Niles, and Robert H. Berg, Elmhurst, Ill., assignors to Coulter Electronics, Inc., Chicago, Ill., a corporation of Illinois
Original application Dec. 29, 1958, Ser. No. 783,546, now Patent No. 2,985,830, dated May 23, 1961. Divided and this application Mar. 3, 1961, Ser. No. 93,232
3 Claims. (Cl. 65—36)

This invention relates generally to means for studying microscopic particles in liquid suspension, and more particularly is concerned with the manufacture of a scanner element for use in apparatus for studying such particles.

This is a divisional application of application for patent of Wallace H. Coulter et al., Serial No. 783,546, filed December 29, 1958, now U.S. Patent No. 2,985,830, issued May 23, 1961.

In U.S. Patent No. 2,656,508 there is described and claimed apparatus of the structure with which the invention is concerned. Said patented apparatus comprises basically a pair of vessels arranged one within the other, means establishing a difference in pressure between the vessels, a small aperture in the inner vessel, and electrodes in the respective vessels connected in the input circuit of a detecting device, such as an electronic amplifier and counter. A suspension of the particles it is desired to study is prepared of a given dilution in a suitable electrolyte and is placed in one of the vessels, usually the outer, and the suspension is caused to flow through the aperture from the outer to the inner vessel by applying pressure to the surface of the fluid in the outer vessel or suction to the surface of the fluid in the inner vessel. The vessels are formed of insulating material, usually glass, and the particles are of a nature to vary the resistance of the electrolyte in the aperture. Thus, the current which flows through the aperture is changed each time that a particle passes through the same and the relationship between the size of particles, resistivity of electrolyte and the diameter of the aperture will determine the response to the detecting circuit.

The change in current flow through the aperture can be used to drive an A.C. amplifier which responds only to the said change so that the output of the amplifier is a pulsed signal, the amplitude of which is a function of the total volume of the particle and the duration of which can be controlled either by electronic circuitry or the duration of the current change. This pulse can be viewed in a cathode ray oscilloscope and can drive counting means; it can be shaped through electronic circuitry, and it can be clipped or otherwise varied for discriminating measurements and other study.

Through the use of certain metering apparatus, such as for example that described and claimed in a co-pending patent application Serial No. 583,850, filed May 9, 1956, by Wallace H. Coulter, one of the applicants herein, and Joseph Richard Coulter, Jr., now Patent 2,869,078, issued January 13, 1959, as the fluid suspension passes through the aperture, the detecting device is quiescent except during a controlled period of time that a predetermined volume of the fluid passes through the aperture. Thus, the scanning of the particles will occur only at the metering period.

The types of particles which have been and are capable of being studied with the apparatus described vary considerably. Biological and mineral particles are both readily counted, measured, graded, compared, and the only differences between systems for use with different particles are in the size of the aperture and the chemistry of the electrolyte. That portion of the inner vessel which has the aperture, and the aperture itself are considered the scanning element for the purpose of this description, since the measurements which take place occur across the aperture.

An upstanding of the nature of the scanning element with respect to its requirements will be obtained by a discussion of the type of particles which can be studied and the aperture dimensions related to particle size. The apparatus responds to effective particle volume, substantially irrespective of shape and orientations, since the electrolyte volume in the aperture is changed and the electrical resistance through the aperture is changed by the presence of the particle therein. Thus, particles which are porous in nature or have rough surfaces may produce responses which are less directly proportional to their true solid volume, but as a rule particles are described in terms of their volumes which are usually converted directly to their equivalent spherical diameters. The apparatus responds to particle volume, irrespective of the shape of the particles, since the electrolyte is displaced by the volume of the particle and the electrical resistance through the aperture is affected by having the solid portion of the particle therein. Thus, particles which are porous in nature will produce responses which are not significantly related to their diameter, but as a rule particles are described in terms of their volumes which are usually directly related to their diameters.

The apparatus which has been described above is used for the measurement and study of an extremely wide variety of particles, including abrasives of all size, foodstuffs of all sizes, dyestuffs, biological particles such as blood cells and platelets, ceramics, pigments, polymer latices, cement, pulp and paper fibre, clays and soils, crystals, minerals, powdered metals and so on. The aperture dimensions are usually related to the particle size so that the diameters of the largest particles are about 30% to 40% of the aperture diameter, while the diameters of the smallest particles effectively measured are about 1% of the diameter of the aperture. The length of the aperture, measured along the axis of the aperture is usually about 75% of the diameter. This establishes the thickness of the wafer within which the orifice or aperture is provided.

Apertures covering a wide range of particles with which the apparatus has been successfully used have been formed in which the diameter of the apertures has been 30 microns to as much as 560 microns. In the smaller size aperture, the length of the aperture is not unusually at least the same dimension as the diameter of the aperture due to the physical problems involved, as will be described. A 30 micron sapphire wafer is usually 30 microns thick. Since 25.4 microns is 1/1000 of an inch, it can be seen that handling this member is a physical problem of no small magnitude.

Small apertures of 30 to 70 microns have been used for studying platelets, fine oil emulsions, fine abrasive, latices, polymerized adhesives and the like. Apertures of 70 to 140 microns in diameter are used for larger particle abrasive, clays, emulsions, and the like, and are especially useful in studying biological and bacterial particles such as blood cells and the like. The 200 micron apertures have been useful in studying catalysts, ceramic powders, and emulsions and abrasives which run 100 microns and less in diameter. The largest apertures are useful in studying foodstuffs, such as for example, catsup particles, fly ash, and other large particles. Where the particles are normally associated with gases, they are first passed into a conducting liquid which serves as the electrolyte.

Various factors dictate aperture size, since a compromise must be made between desired sensitivity, speed of scanning, problems of coincident passage of groups of particles, debris, etc. The sensitivity refers to the amplitude of the pulse produced by the passage of a particle of given size. Obviously, the greater the pulse, the easier it is to distinguish between particles whose volumes differ only by a very small amount. The speed of scanning is a factor which is controlled directly by the diameter of the aperture since the rate at which the suspension will flow determines the time that a given volume can pass, and a given reading or determination made for that volume. Coincident passage of particles is important because when a group of particles pass through the aperture simultaneously there will be only one pulse, although much larger than normal in amplitude. The counting device will only record one pulse, representing only one particle. Dilution decreases the coincidence, but the size of the aperture is also an influence. Debris, of course, is almost always present, and the need for keeping the aperture clear is obvious. In most systems, a microscope is permanently focussed on the scanning element so that a continuous visual check on the same may be made. The presence of debris in the aperture, sometimes in the form of lint or large dirt particles, or in the case of biological measurements—shreds of tissue or fibre—will block the flow of particles, will give false readings, and will prevent accuracy of measurements and counts. Larger apertures more readily pass debris.

The smaller the aperture the greater the sensitivity, the slower the scanning time, and the more likely that debris will be a disturbing factor. Even noise caused by debris that continuously passes without lodging in the aperture is increased, but the increase in signal through passage of particles is so much greater in amplitude that the electronic threshold means can be used to adjust the measuring level and eliminate all noise and "hash" from the counting and cathode ray display circuits. Larger apertures increase the speed of scanning, decrease the likelihood of debris lodging in the aperture, but decrease the sensitivity and increase the likelihood that coincident groups of particles will be in the aperture simultaneously. The amount of coincidence for any given set of constant condition is directly proportional to the total volume of the aperture. For known dimensions, the probability of coincidence can be computed and a count modified by a factor which compensates for coincidence counts.

In any event, it is practically essential to know the exact aperture size for calibration of the detecting device since studies of gradients of particles of different volumes in a given suspension demand an accurate measure of pulse relation to particle volume. While it is true that a scanner element can be calibrated through the use of standard particles in a known dilution, such as for example uniform globules of polystyrene latex, it is neither convenient nor desirable for each purchaser of an apparatus to run calibration experiments on the apparatus each time that a scanner element is changed, as occasioned through breakage, erosion of the scanner element, and the desire to use the apparatus for widely differing particles.

The initial scanner elements used in the above described patented apparatus comprised merely small openings formed in the sides of test tubes. A tube was heated along its side wall, a small heated rod of glass touched to the tube long enough to adhere and then pulled away from the wall to form a small opening in the wall. Collapse of the wall during this process was prevented by blowing into the tube, a common glass working technique. These openings could not be formed uniformly, and hence it was necessary to use washers of glass which would be uniform in dimension and cement them to the openings formed as described. Such wafers were formed of extremely thin sections of capillary tubing, lapped and polished, and adhered to the side wall of the vessel by various cements and adhesives.

The cemented wafer of glass was satisfactory so long as the fluid within which the particles were suspended did not dissolve the same or were not excessively abrasive, but even for such uses, cleaning the vessel was a problem because most cleaning agents which would dissolve debris were of such corrosive or solvent nature as to destroy the adhesive bond and separate the wafer from the tube. Even water or saline solution used over a period of time would dissolve many adhesives.

In industrial uses which required the fluid suspension to be formed of industrial solvents, such as various kinds of hydrocarbons, or where the fluid was corrosive, the cemented wafers formed unsatisfactory scanning elements, requiring frequent replacement, and often being useless where the nature of the solvent was such that no adhesive could be made to secure the wafer for any satisfactory length of time.

These first glass wafers could not be fused to the glass because the application of sufficient heat for this purpose would destroy the microscopically thin wafer, would distort and wrinkle it, and at the least would completely change the dimensions of the orifice such that uniformity between scanning elements was a complete impossibility.

The invention herein is directed to the objects of making a novel scanning element which alleviates the disadvantages described in detail above, and includes among other things a novel method of making such a scanning element. These objects include forming a scanning element of a very hard substantially inert material bonded and fused to the side of a glass vessel in such a manner that the critical dimensions of the scanning aperture are substantially unaffected; the provision of a scanning element which is capable of being used in substantially any liquid medium without dissolving or changing the dimensions thereof or breaking the bond thereof with the vessel; the provision of a scanning element which can be readily cleaned mechanically, if need be, or boiled in acid or solvent, without in any way destroying the same or changing the dimensions thereof.

This invention has an additional object the making of a scanning element which comprises an annular sapphire wafer or disc of very small dimensions fused in surface-to-surface contact with the side wall of a glass or other ceramic vessel, and at least partially embedded therein, with the aperture or orifice of the sapphire wafer aligned with an opening provided in the wall of the vessel.

Still another object is concerned with a method of mounting the sapphire disc above described.

Many other objects of the invention will occur to those skilled in this art as the description proceeds, in connection with which a preferred manner of practicing the method embodying the invention is described and illustrated in the drawings, but only by way of example, and not to limit the scope of the invention.

The drawing illustrates the following:

FIG. 1 is a diagrammatic view of an entire system which uses the invention, in order to enable a clear explanation of the environment of said invention to be made.

FIG. 2 is a fragmentary sectional view on an enlarged scale showing the bottom end of the inner vessel of the system of FIG. 1.

FIG. 3 is a sectional view transversely through the vessel of FIG. 2 on the line 2—2 of said figure and in the direction indicated to show the contours of the tube.

FIG. 4 is a front-on elevational view of the bottom end of the vessel of FIG. 2 to illustrate the scanning element installed.

FIGS. 5, 6, 7 and 8 are diagrammatic sectional views on a greatly enlarged scale to illustrate various steps in the process of forming the scanning element.

Referring to FIG. 1, the system or apparatus with which the invention is associated is diagrammatically illustrated. The several parts of the apparatus are designated as the scanning apparatus 10, a metering device 14 and the detector 12. The scanning apparatus 10 comprises a pair of glass vessels 16 and 18, the former being a tube having a closed bottom end 20 and an open mouth 22 at its upper end, and the latter vessel being a simple beaker.

A branched glass member 24 has a lower tapered fitting 26 formed thereon, said fitting being engaged in fluid-tight connection with the mouth 22 of the tubular vessel 16. One branch 28 connected with the metering device 14, another branch 30 has a stopcock 32 therein and is used for flushing the interior of the scanning apparatus. The branched member 24 is adapted to be connected through another branch 34 to a source of constant vacuum, there being a control stopcock 36 in this branch.

The scanner element designated generally 40 is provided on a side wall of the tubular vessel 16 adjacent the bottom end thereof, albeit spaced above the said bottom end 20 to avoid interference with sediment. The tube is deformed at this point for a purpose to be described. The scanner element includes an aperture or orifice 42 through which the suspension fluid passes, from the body of fluid 44 of the beaker 18 to the body of fluid 46 on the interior of the tubular vessel 16. These fluids may not necessarily be of the same properties, in view of the manner of using the apparatus, which is one of the advantages of the patented structure.

There is an electrode 48 on the interior of the tubular vessel 16 and another electrode 50 on the interior of the vessel 18, both vessels being immersed in their respective bodies of fluid and being respectively connected by electric conductors 52 and 54 to the detecting device 12.

The detecting device provides electronic means to count and measure the change in resistance in the aperture 42. The detecting device 12 may include a cathode ray oscilloscope to give a visual display of the pulses produced through the passage of particles, and electronic counting means. The counting means is connected to operate in conjunction with metering means, to count the number of pulses which are produced as a pre-determined volume of the fluid passes through the aperture 42. Since the dilution of the suspension is known, the number of particles counted has a pre-determined relationship to the concentrate from which the dilution was made.

The metering device 14 in the apparatus of FIG. 1 comprises a cylindrical tube 56 having a plunger or piston 58 which is movable therein. The piston 58 is connected with a flexible member such as a cord 60 which passes over a sheave 62 mounted on a wheel 64 and has a weight 66 secured to its end. When vacuum is applied to the branch 34 the piston 58 is drawn to the upper end of the tube 56, raising the weight 66. After the stopcock 36 is closed, the weight 66 pulls the piston 58 down and this draws fluid through the aperture 42. As the wheel 64 rotates, a projection 68 formed thereon first closes the switch 70 which starts the electronic counter, and then closes the switch 72 which stops the electronic counter in the detector 16. The positions of the switches may be adjusted so that the counter operates only for the period that a certain pre-determined volume of liquid is drawn through the aperture 42.

The structure described above includes the scanner element 40, which is the principal subject matter of this description. The disadvantages described in connection with prior scanner elements have been set forth and have been overcome by the structure described herein.

The tubular vessel 16 has a flattened side wall 74 in which a small annular wafer of sapphire 76 is fused, the center aperture 42 in the wafer comprising the aperture of the scanning element 40. This aperture is accurately drilled in the wafer. The wall 74 has a funnelled orifice 78 in the side wall the axis of which is aligned with the axis of the aperture of sapphire wafer 76. The glass from which the lower end of the tubular vessel is formed is preferably a low expansion heat resisting glass which is of the type usually utilized in making glass to metal seals. This glass could be the type designated in the trade as a "Kovar" sealing glass. Various borosilicate glasses could be used whose coefficient of expansion may be between $32 \times 10^{-7}$ to $64 \times 10^{-7}$. These glasses soften at about 800° C. to about 900° C. and it is preferred that the coefficient of expansion be close to that of the sapphire from which the wafer is made. Sapphire's coefficient of expansion is between $50 \times 10^{-7}$ and $6.7 \times 10^{-7}$ depending upon the crystalline axis along which the measurements are made. The coefficients are usually considered at the low thermal interval, since the coefficient of expansion usually rises with temperature. Furthermore, the importance of coefficient of expansion comes into the situation during cooling when the differences between glass properties and the wafer's properties can result in internal strains not capable of being removed by annealing.

In order to secure such glass members to the upper end of the vessel 16, it is necessary to have a graded seal, of thermal properties between those of the top and bottom of the vessel, and this is shown at 80 and may comprise a uranium glass having an intermediate coefficient of expansion.

Sapphire is a crystalline mineral oxide of aluminum, comprising $Al_2O_3$ with some impurities, being quite hard, and having a high softening point—about 2040° C. Aluminum oxide comes in several other forms, such as corundum, Alundum, and ruby, any of which would be suitable for use as the wafer. The transparent materials are best, for a reason presently to be explained. These materials which occur in nature or are grown as synthetic crystals by techniques well-known.

In making the scanner element 40, first the orifice 78 is formed as previously described, through the heating of the side wall 74, touching a heated glass rod to the wall, pulling out and forming the structure somewhat as shown in FIG. 5, having a slightly protruding rim 82 which is characteristic of fire-polishing. The outer surface of the wall 74 is next ground flat as shown in FIG. 6, providing thereby a flat planar surface 84 about the orifice 78. This flat surface is not polished so that the characteristic frosted appearance of ground glass surfaces is had.

In forming the orifice 78, the pulling of the opening, as it is known, gives rise to the funnelled effect illustrated, which is desirable to prevent the lodging of debris or bubbles in the orifice 78. The diameter of the orifice 78 at the surface 84 is preferably about one millimeter to allow for possible changes during the securement of the sapphire wafer. The sapphire wafer is preferably about one to three tenths of a millimeter thick, the smaller limiting dimension being the size of the orifice. The sapphire wafer 76 is then laid upon the surface 84 which its aperture 42 aligned with the orifice 78. The sapphire wafer 76 is then heated on its outer surface with a fine, hot flame 86, avoiding the aperture as much as possible. The heat will gradually penetrate the wafer and soften the surface 84 immediately beneath the wafer, while at the same time somewhat softening the wafer, but not materially causing flow of the sapphire to change the dimensions of the aperture 42. The glass of the wall 74 softens and fuses with the bottom surface of the sapphire wafer 76 wetting the same. There must be a complete fusing, and this can readily be seen from the outside because as the fusing occurs the frosted appearance of the ground surface 84 changes to a clear appearance, indicating when the fusing is complete. Obviously there is an advantage in transparency of the wafer. Depending upon the thickness of the wafer 76, it may become partially or completely embedded in the wall 74.

After this process is completed, the entire tubular member 16 is annealed, and is then ready for assembly to the apparatus described. As stated, the sapphire wafer 76 is inert to all fluids which are encountered in particle study, and likewise the glass of the seal is not dissolved by any known cleaning agents or solvents or corrosive fluids normally used. The wafer 76 therefore cannot be washed out or dissolved from its fused connection, and even mechanical brushing or rubbing of the same will have no effect upon a properly made seal.

It will be appreciated that complete uniformity in scanner elements can be achieved by the method of the invention. Other advantages will occur to those skilled in this art. Other materials having the thermal properties of sapphire can be used, such as for example, ruby, corundum, and the like. The solution of the problem taught herein also enables other materials to be considered, both for the vessel 16 and the wafers secured to the same. These must have cooperative resistance to heat and corrosion, as well as compatible coefficients of expansion. Vessels could be made of other vitreous materials besides glass, such as ceramics which would receive wafers thereon. The wafers could be made of vitreous materials also, such as ceramics which have high heat resistivity and coefficients of thermal expansion not radically differing from that of the host vessel. In the case of glass vessels, special extremely hard glass wafers could be used if sapphire is not available, such wafers acting like sapphire in the respect that they do not readily soften and melt, so that the heat transferred through them is sufficient to melt the glass of the host vessel beneath the wafer and thus result in the desired fusion of wafer to vessel, without materially altering the critical dimensions of the wafer.

It is desired to be limited only by the claims appended hereto considered in their broadest aspect, in view of the prior art.

What it is desired to secure by Letters Patent is:

1. A method of making a scanner element of the character described which is in the form of a wafer of high heat resistivity having a central aperture fusedly secured to the wall of a tube vitreous material having a substantially lower heat resistivity in alignment with an orifice in said tube which comprises: forming an orifice in said tube wall by pulling a heated point of said wall out of said wall, grinding the wall flat at said orifice, laying the wafer on the orifice with its aperture aligned therewith, heating the wafer on the exposed surface thereof by applying the extremity of a pointed flame only adjacent the periphery of said exposed surface whereby the heat is transmitted through the wafer to the vitreous wall causing fusing of said wafer to said wall.

2. A method of making a scanner element of the character described which includes a vessel having a vitreous ceramic wall provided with an orifice and a wafer of a high heat-resistance material having a substantially permanent contour aperture secured to said wall overlying the orifice: said method comprising, forming an orifice in said wall of minute cross-sectional configuration by initially heating and elevating a substantially conical protrusion on a surface of said wall with the protrusion being internally tapered, grinding the crown of said conical protrusion to form said orifice with a flat planar perimetric face there-around, supporting said wafer on said flat face overlying the orifice with the aperture aligned with the orifice, and then, heating the wafer directly and controlled to transmit heat therethrough to the said wall sufficient to fuse the wafer on said flat face without distorting said aperture.

3. A method of making a scanner element for use in a particle analyzing apparatus in which a fluid carrying particles therein is passed through an aperture provided with electrical means for detecting passage of the particles through the aperture in terms related to the detectable change in resistance of the fluid in the aperture because of the concurrent presence of said particles: said method comprising, forming an elevated tapered point on an outer surface of said vessel, grinding the said elevation to provide an orifice in said wall surrounded by a flat, planar surface, forming an aperture of microscopic cross-section in a disc of a hard crystalline material substantially resistant to the fluids to be analyzed wherein the cross-section of the aperture is substantially smaller than that of said orifice, holding said wafer on said flat surface overlying said orifice with the aperture thereof aligned with said orifice and applying heat from a fine point source directly to the periphery of the wafer and controlled to transmit said heat to the wall sufficient to fuse the wafer on said surface without distorting the aperture.

References Cited in the file of this patent

UNITED STATES PATENTS

| 1,548,611 | Kearsley et al. | Aug. 4, 1925 |
| 2,345,498 | Perley | Mar. 28, 1944 |
| 2,398,737 | Elliot et al. | Apr. 16, 1949 |
| 2,504,504 | Despois | Apr. 18, 1950 |
| 2,584,427 | Craston | Feb. 5, 1952 |
| 2,677,920 | Danzin et al. | May 11, 1954 |

FOREIGN PATENTS

| 1,029,077 | France | Mar. 4, 1953 |